Aug. 19, 1924.
J. P. FOSTER
DISTILLING APPARATUS
Filed Nov. 20, 1922
1,505,634
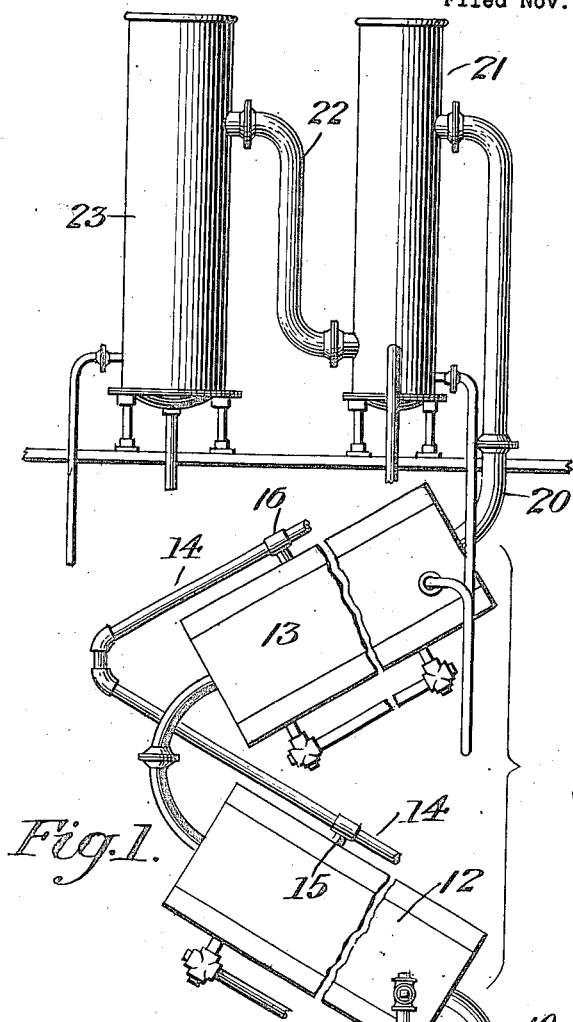
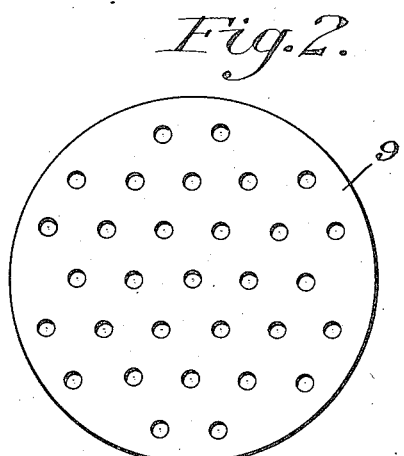
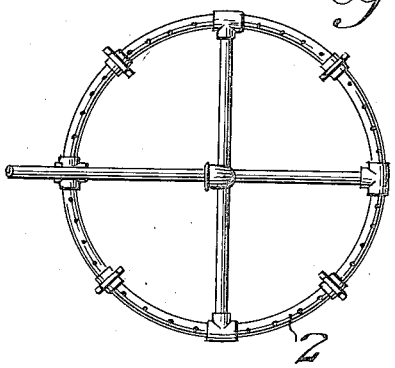
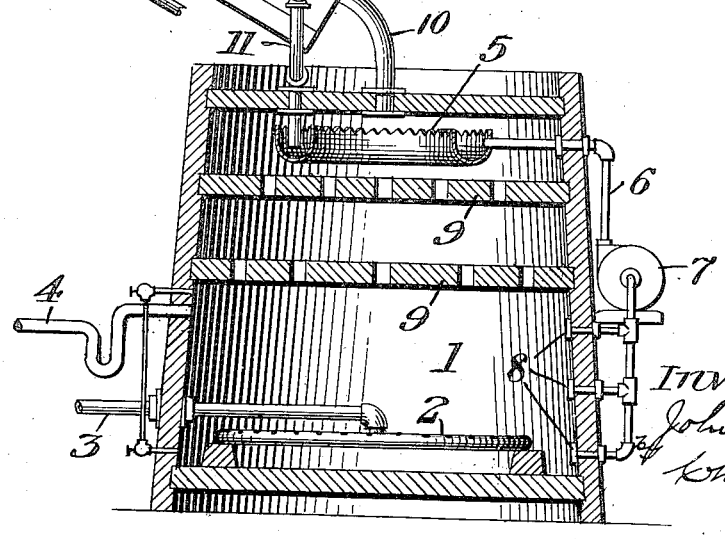

Patented Aug. 19, 1924.

1,505,634

UNITED STATES PATENT OFFICE.

JOHN PRESTON FOSTER, OF PAIA, MAUI, TERRITORY OF HAWAII.

DISTILLING APPARATUS.

Application filed November 20, 1922. Serial No. 602,087.

*To all whom it may concern:*

Be it known that I, JOHN PRESTON FOSTER, a citizen of the United States, residing at Paia, Maui, Territory of Hawaii, have invented certain new and useful Improvements in Distilling Apparatus; and I do hereby declare the following to be a full, clear, and exact description of the invention, such as will enable others skilled in the art to which it appertains to make and use the same.

This invention relates to improvements in distilling apparatus of the continuously operating type and in which the beer is fed into a distilling column in which the alcoholic vapor is separated from the liquid content, the vapor flowing upwardly through the column to a condenser and the liquid flowing downwardly into a heating chamber or pot for further treatment. The beer entering the pot is not fully exhausted and is further treated to save the residual alcohol.

The present invention more particularly relates to certain improvements in the pot or heating chamber whereby a more complete separation of the alcohol from the other liquid is accomplished. It has for its object the provision of means whereby the beer entering the pot is finely subdivided to be more readily heated and the vaporization of the alcohol residue more easily accomplished. It also has for its object the provision of means whereby the beer is constantly circulated in the pot and thereby repeatedly subjected to the vaporizing action, resulting in the saving of practically all of the alcohol in the beer. The means employed for finely subdividing and constantly circulating the beer in the pot will be described in detail hereinafter.

In the patent issued to me and A. F. Misener August 27, 1923, No. 1,466,221, is disclosed a complete distilling apparatus of the type under consideration, and the present invention is particularly adapted to be used in such apparatus.

While the present invention will be described as forming part of a constantly operating still, yet it can be used to an advantage in discontinuous or intermittent stills.

In the drawings, in which similar reference characters designate corresponding parts, Fig. 1 is a view of a distilling apparatus embodying the invention, the view being partly in elevation, broken away in parts, and partly in section, the latter being taken through the heating chamber or pot.

Fig. 2 is a detail view, showing a plan of one of the foraminous baffles.

Fig. 3 is a similar view, showing a plan of the heating coil.

The heating chamber or pot is formed by a tub-like receptacle or tank 1 closed at the top and bottom. In the lower part of the pot is the heating coil 2, suitably supported at a slight elevation above the bottom of the pot, and to which leads the pipe 3 from a suitable source of steam pressure (not shown). The upper surface of the coil 2 is perforated at intervals to admit steam into the pot. An overflow pipe 4 leads from the pot to maintain a constant level of the liquid therein, and in this pipe is a loop to form a liquid-seal to prevent the escape of vapor.

In the upper part of the pot is the annular trough 5 with serrated edges and into this trough leads the pipe 6 from the pump 7 communicating through the branched pipe 8 with the lower part of the pot. With the pot filled with liquid to the level of the pipe 4, the pump in action will pump the liquid from the pot into the trough 5, over the edge of which the liquid flows to the lower part of the pot again. In this way a constant circulation of the liquid through the pot is maintained contrawise to the flow of the vapor and the pipe having branches 8 communicating with the pot at different levels insures the circulation of the entire liquid content of the pot. In the upper part of the pot and below the trough 5 are the separated foraminous baffles 9.

The edges of the trough 5 are serrated for the purpose of dividing the overflowing liquid into fine drops or streams, which impinge on the successive baffles and are further subdivided. When steam is admitted under pressure to the coil 2, it passes through the apertures in the upper side of the coil and commingles with the liquid in the pot with more or less ebullition and heats the liquid. The steam heats the entire interior of the pot and the alcohol in the upper part of the pot is quickly vaporized. The vaporized alcohol, together with some of the water that is also vaporized, passes from the upper part of the pot through the pipe 10 into the lower part of the distilling column 12. Into this column and also the succeeding column 13 the vaporized alcohol and water pass, and where the alcoholic vapor is freed from the particles of water and flows from the upper end of the column 13 through the pipe 20 into the doubler 21, thence through the pipe 22 into the condenser 23. The treatment of the fluid in the columns 12 and 13 and the doubler 21 and condenser 23 is that usually employed. Beer is fed through the pipe 14 and the branches 15 and 16 into the columns 12 and 13 respectively, the beer having been previously heated to vaporize the alcoholic content. In the distilling columns the alcoholic vapor and the liquid are separated, the vapor flowing upwardly to be condensed and the liquid flowing downwardly into the lower part of the column 12, from which it flows through the pipe 11 into the trough 5, where it mixes with the liquid pumped into the trough from the lower part of the pot. The beer passing into the trough 5 from the lower part of the column 12 still retains considerable alcohol and its further treatment in the pot is for the purpose of recovering this alcohol.

In operating the apparatus, the pot 1 is filled with water or the liquid to be distilled to cover sufficiently the heating coil 2. Steam is then admitted to the coil and when the liquid previously admitted to the pot becomes sufficiently heated vapors arise therefrom and pass through the pipe 10 into the distilling columns 12 and 13 successively. At this time the beer or material to be distilled is admitted into the columns through the pipe 14 and its branches and the distillation begins, the alcoholic vapor flowing upwardly through the columns to be condensed and the liquid flowing downwardly through the pipe 11 into the pot. There is no assurance that all the alcohol has been recovered from the beer entering the pot and it is further treated to save any alcohol that might remain. The beer on entering the pot is first subdivided by flowing over the serrated edges of the annular trough 5 and further divided by striking against and passing through the foraminous baffles 9. By this treatment the beer or liquid to be treated is very finely divided and distributed and in this condition is much more easily heated and gives up its alcohol content more readily. In the passage of the finely divided liquid, or practically liquid in suspension, through the baffles it is thoroughly distributed and comes into intimate contact with the vapor arising from the liquid in the lower part of the pot heated by the steam coil and this rising vapor is also thoroughly distributed by the baffles to facilitate the intimate commingling of the rising vapor with the falling spray. By this treatment there is a strong tendency for any residual alcohol in the beer to vaporize and this tendency is increased by the constant circulation of the liquid through the pot contrawise to the vapor flow as thereby the beer is repeatedly subjected to the vaporizing influence. The alcoholic vapor so produced rises through the pipe 10 into the column for further distillation.

The outlet pipe 4 being located to maintain a constant level in the pot, the distilled material or beer will escape through the pipe in the same quantity that the beer enters through the pipe 11. But as the body of the liquid being treated in the pot is constantly circulated it is quite evident that none of the liquid will escape through the overflow pipe without being subjected a number of times to the de-alcoholizing action. Consequently, practically all of the alcohol will be recovered.

In my apparatus the liquid in suspension or finely divided is much more readily heated and gives up its alcohol more freely to the vaporizing action, thus furnishing in the pot steam or vapor for treatment in the distilling columns; there is also a lessened hydrostatic pressure against the heating coil so that the steam can be utilized in a more efficient manner. Also, the loss of alcohol is greatly reduced or avoided altogether and the capacity of the still is greatly increased, as in most stills the limiting feature as to capacity is not the lack of ability to run the liquid through quickly, but is due to the sluggish rate at which the alcohol is extracted. By means of the apparatus employed in my invention there is a complete and active separation of the alcohol and it is due to this that the still can be operated at a high rate of production without appreciable loss.

Having thus described my invention, what I claim is:—

1. In a distilling apparatus, the combination of a distilling column and a heater for the liquid to be distilled comprising a closed tank provided with a heating means and having a vapor outlet at its upper part communicating with the distilling column and the latter having a liquid outlet at its lower end communicating with the upper part of the tank, and means in the upper part of the tank for subdividing and distributing the entering liquid from the column to commingle with the rising vapor.

2. In a distilling apparatus, the combination of a distilling column and a heater for the liquid to be distilled comprising a closed tank provided with a heating means and having a vapor outlet at its upper part communicating with the distilling column and the latter having a liquid outlet at its lower end communicating with the upper part of the tank, means in the upper part of the tank for subdividing the entering liquid from the column, and a distributor in the upper part of the tank for spreading the subdivided fluid and rising vapors and to commingle the same.

3. In a distilling apparatus, the combination of a distilling column and a heater for the liquid to be distilled comprising a closed tank provided with a heating means and having a vapor outlet at its upper part communicating with the distilling column and the latter having a liquid outlet at its lower end communicating with the upper part of the tank, means in the upper part of the tank for subdividing the entering liquid, and a distributor in the upper part of the tank comprising one or more foraminous baffles for distributing the subdivided fluid and rising vapors and to commingle the same.

4. In a distilling apparatus, the combination of a distilling column and a heater for the liquid to be distilled comprising a closed tank provided with a heating means and having a vapor outlet at its upper part communicating with the distilling column and the latter having at its lower end a liquid outlet communicating with the upper part of the tank, and an annular trough in the upper part of the tank into which empties the liquid outlet of the column, said trough operating to subdivide and distribute the liquid to commingle with the rising vapor.

5. In a distilling apparatus, the combination of a distilling column and a heater for the liquid to be distilled comprising a closed tank provided with a heating means and having a vapor outlet at its upper part communicating with the distilling column and the latter having at its lower end a liquid outlet communicating with the upper part of the tank, an annular trough in the upper part of the tank in which empties the liquid outlet of the column, and a pump for forcing the liquid from the lower part of the tank into said annular trough, the latter operating to subdivide and distribute the collected liquid to commingle with the rising vapor.

6. In a distilling apparatus, the combination of a distilling column and a heater for the liquid to be distilled comprising a closed tank provided with a heating means and having a vapor outlet at its upper part communicating with the distilling chamber and the latter having at its lower end a liquid outlet communicating with the upper part of the tank, an annular trough in the upper part of the tank into which empties the liquid outlet of the column, and a foraminous baffle mounted in the upper part of the tank below the annular trough, said trough and said baffle successively operating to subdivide and distribute the liquid collected by the trough to commingle with the rising vapor.

7. In a distilling apparatus, the combination of a distilling column and a heater for the liquid to be distilled comprising a closed tank provided with a heating means and having a vapor outlet at its upper part communicating with the distilling chamber and the latter having at its lower end a liquid outlet communicating with the upper part of the tank, an annular trough in the upper part of the tank into which empties the liquid outlet of the column, a foraminous baffle mounted in the upper part of the tank below the annular trough, and a pump operating to force the liquid from the lower part of the tank into the annular trough, said trough and said baffle successively operating to subdivide and distribute the liquid collected by the trough to commingle with the rising vapor.

8. In a distilling apparatus, the combination of a distilling column and a heater for the liquid to be distilled comprising a closed tank provided with a heating means and having a vapor outlet at its upper part communicating with the distilling column and the latter having a liquid outlet at its lower end communicating with the upper part of the tank, means for maintaining a constant level of the liquid in said tank, exterior means for circulating the liquid from the lower part of the tank to the upper part of the same, and means in the upper part of the tank for subdividing and distributing the liquid entering the upper part of the tank to commingle with the vapor rising from the heated fluid in the lower part of the tank.

In testimony whereof I affix my signature.

JOHN PRESTON FOSTER.